Oct. 16, 1951 — W. F. O'HALLORAN — 2,571,750

CHILD'S VEHICLE

Filed Oct. 21, 1948 — 2 SHEETS—SHEET 1

INVENTOR.
William F. O'Halloran.
BY W. L. Stout
HIS ATTORNEY

INVENTOR.
William F. O'Halloran.
BY W. L. Stout
HIS ATTORNEY

Patented Oct. 16, 1951

2,571,750

UNITED STATES PATENT OFFICE 2,571,750

CHILD'S VEHICLE

William F. O'Halloran, Greensburg, Pa.

Application October 21, 1948, Serial No. 55,713

3 Claims. (Cl. 280—87.01)

My invention relates to a child's vehicle, and particularly to a child's vehicle of the type adapted to be propelled by a child sitting thereon.

One object of my invention is to provide a four wheel vehicle of the type described having novel means for steering the vehicle.

Another object of my invention is to provide a vehicle which is attractive in appearance, and which due to its shape and method of steering reduces the likelihood of damage to furniture, woodwork and the like, to a minimum.

According to my invention, the vehicle comprises a seat board supported by two pairs of wheels mounted on similar wheel supports or bolsters which are both free to rotate through a limited angle relative to the seat board. The front wheel support is secured to the lower end of a steering post so as to be rotated thereby, and the two wheel supports are operatively connected together by suitable means in such manner that rotation of the front wheel support will produce substantially equal and opposite rotation of the rear wheel support, whereby the rear wheels are made to track the front wheels in all positions of the wheels, and a short turning radius is provided. To facilitate turning the steering post, the upper end of the post is provided with a suitable handle. The ends of the seat board are rounded, and the parts are so proportioned that the seat board projects outwardly beyond the wheels in all positions of the wheels. This construction together with the method of steering provided reduces to a minimum the likelihood of damage to furniture, woodwork or the like by a child riding the vehicle.

I shall describe three forms of vehicles embodying my invention, and shall then point out the novel features thereof in claims.

Figure 1:
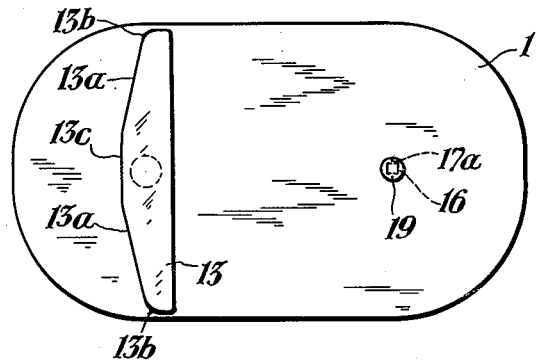
Figure 3:
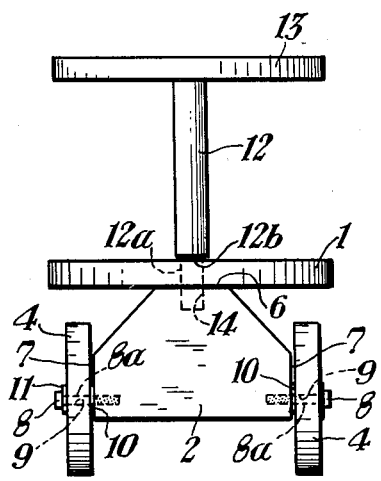
Figure 2:
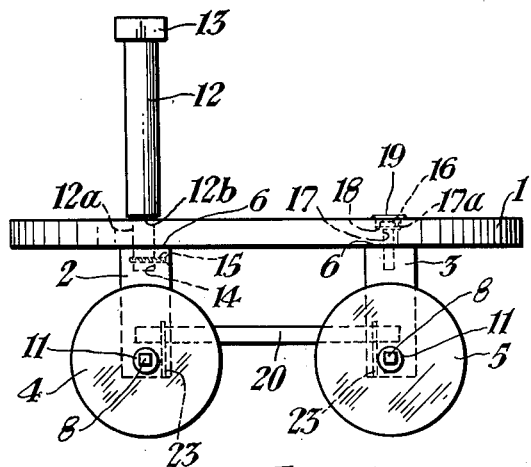
Figure 4:
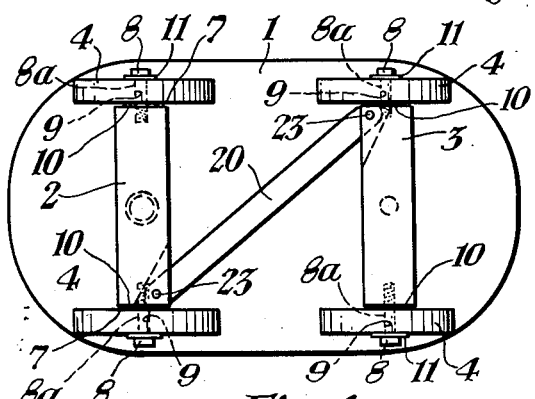
Figure 5:
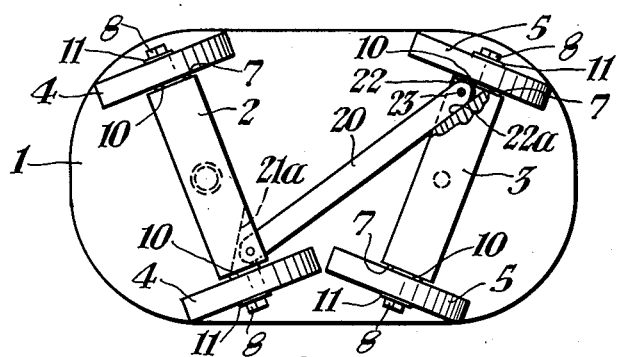
Figure 6:
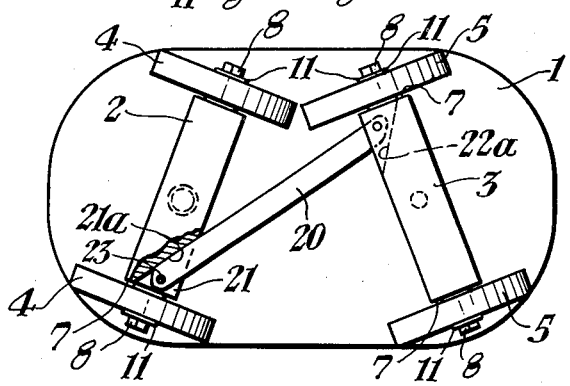
Figure 7:
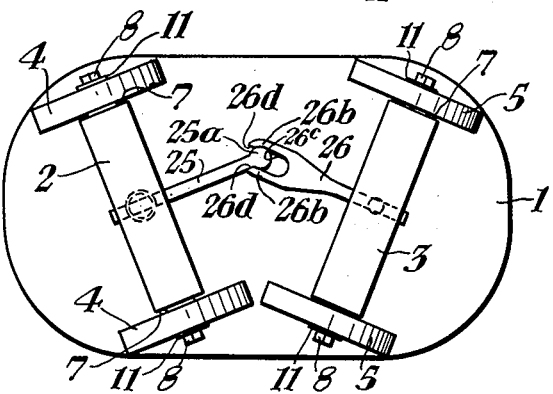
Figure 8:
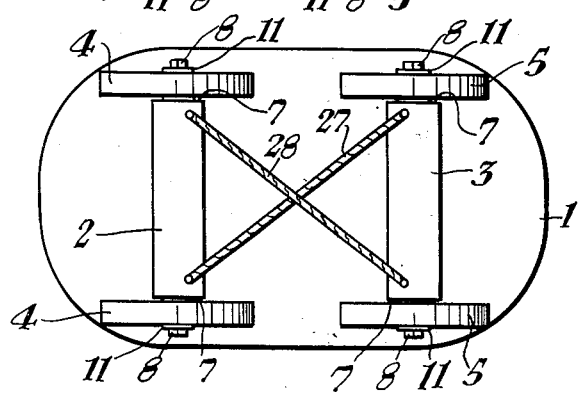

In the accompanying drawings, Fig. 1 is a top plan view showing one form of vehicle embodying my invention. Figs. 2, 3, and 4 are side, front, and bottom views of the vehicle shown in Fig. 1. Figs. 5 and 6 are bottom views of the vehicle shown in Fig. 1 with the parts in different positions which they may assume during operation of the vehicle. Figs. 7 and 8 are bottom views showing modifications of the vehicle illustrated in the preceding views.

Similar reference characters refer to similar parts in each of the several views.

Referring first to Figs. 1 to 6, inclusive, the vehicle in the form here shown comprises an elongated seat board 1 of sufficient width to adequately support a child sitting thereon with its legs projecting out over the front of the board in convenient positions to propel the vehicle. The edges of the board are rounded to remove all rough corners for obvious reasons, and the front and rear ends of the board are provided with relatively large radii for a purpose which will be made clear presently.

The seat board 1 is mounted on front and rear wheel supports or bolsters 2 and 3 to which front and rear pairs of wheels 4 and 5 are rotatably secured in any convenient manner. The bolsters are preferably made alike to reduce manufacturing costs, and each is provided at its upper end with a bearing surface 6 which is sufficiently large to provide adequate support for the board, but which at the same time will not provide excess friction to rotation of the bolster through a limited angle relative to the seat board.

The bolsters are formed with vertical end surfaces 7, and the wheels, as here shown, are secured to these end surfaces by lag screws 8 which pass through clearance holes 9 in the wheels. The wheels are spaced from the end surfaces by washers 10 and other washers 11 are provided on the lag screws between the heads of the screws and the outer surfaces of the wheels. The lag screws are preferably formed with non-threaded shank portions 8a where they pass through the wheels to present smooth bearing surfaces to the wheels.

It should be distinctly understood that while I have shown the wheels secured to the bolsters by means of lag screws in the manner just described, my invention is in no way limited to this construction, and other convenient means may be employed to secure the wheels to the bolsters.

The front bolster 2 is secured to the lower end of a steering post 12 which extends upwardly through the seat board, and is provided at its upper end with a steering handle 13. As shown in the drawing, the steering post is round, and the portion 12a which extends through the board is reduced in diameter to form a shoulder 12b which cooperates with the upper side of the seat board to limit vertical movement of the board relative to the steering post. The steering post may be fastened to the front bolster in any convenient manner, but I prefer to secure it to the bolster by inserting the reduced lower end 12a with a snug fit into a hole 14 in the bolster and locking it in place by a locking screw 15. If desired, a glue joint may be provided between the reduced lower end 12a of the steering post and the bolster in accordance with well known practice.

The steering handle 13 may have any convenient shape to enable a child riding the vehicle to readily grasp it. As shown, it is given a streamlined appearance by providing the handle with rearwardly inclined forward edges 13a at each side which merge into rounded ends 13b and a straight central portion 13c.

The rear bolster 3 is pivotally attached to the seat board 1 by suitable means, such as a lag screw 16, so that it is free to rotate through a limited angle relative to the seat board in response to rotation of the front bolster in a manner which will be made clear presently. The shank of the lag screw is preferable formed with a non-threaded portion which passes through a clearance hole 17 in the seat board, and the head is disposed within a circular recess 17a formed in the seat board at the upper end of the hole. To prevent the head of the lag screw from cutting into the seat board a washer 18 is provided under the head of the lag screw. If desired a suitable decorative cap 19 may be inserted in the upper end of the recess to conceal the head of the lag screw.

According to the principal feature of my invention the two bolsters 2 and 3 are connected together in such manner that rotation of the front bolster by the steering post 12 will produce substantially equal and opposite rotation of the rear bolster 3 whereby, when the vehicle is being ridden by a child the back wheels will track the front wheels in all positions of the wheels. The interconnection of the bolsters may be accomplished in a variety of ways. In Figs. 1 to 6, inclusive, I accomplish this interconnection by means of a link 20, one end of which is pivotally attached to the bolster 2 within a slot 21 formed in the inner face of this bolster adjacent one end thereof, and the other end of which link is pivotally attached to the bolster 3 within a slot 22 formed in the inner face of this latter bolster adjacent the opposite end thereof. The means for pivotally attaching the link to the bolsters may, for example, comprise an ordinary nail 23 or the like. The points at which the opposite ends of the link are pivotally attached to the bolsters are preferably equi-distant from the axis of rotation of the associated bolster, and the parts are so proportioned that when the steering handle 13 is at right angles to the longitudinal axis of the seat board, the bolsters will lie in parallel planes and the wheels will be in positions to cause the vehicle to move in a straight line, but that, rotation of the handle 13 in either direction from the position in which it is at right angle to the longitudinal axis of the seat board will cause approximately equal and opposite rotation of the bolster.

It is desirable for obvious reasons to limit rotation of the bolsters to an amount which will prevent the wheels from touching each other, and to this end I shape the inner edge 21a of the slot 21 so that it will engage the side of the link 20 and act as a stop, as shown in Fig. 6, when the bolsters have been rotated to one extreme position in which the front and rear wheels on one side of the vehicle will just clear each other, and I likewise shape the inner edge 22a of the slot 22 so that it will engage the side of the link 20 and act as a stop, as shown in Fig. 5, when the bolsters have been rotated to the other extreme position in which the front and rear wheels on the other side of the vehicle will just clear each other.

It will be obvious from Figs. 5 and 6 that when the bolsters are rotated to their extreme positions a relatively short turning radius is provided and at the same time the wheels are in position to lend stability to the vehicle. This is a distinct advantage over the well known form of child's vehicle having a single front steering wheel.

It will also be obvious from Figs. 5 and 6 that the rounded ends of the seat board project out over the wheels far enough so that the only part of the vehicle which can bump into furniture, woodwork or the like, is the seat board. The vehicle is intended to be ridden by a child sitting on the board with his legs projecting out over the front end of the seat board on opposite sides of the steering post 12, and it will be seen therefore that the child's legs will prevent the front end of the vehicle from bumping into furniture, woodwork or the like. A child can ride the vehicle backwards, but the fact that the edges of the seat board are rounded and the rear end of the seat is formed with a large radius and projects out over the wheels in the manner described above minimizes the likelihood of damage to furniture, woodwork or the like from this cause.

Referring now to Fig. 7, in the modified form of my invention here shown, the front and rear bolsters 2 and 3 are operatively connected by two arms 25 and 26. The arm 25 is secured at one end to the bolster 2 at the center of the bolster, and is provided at its free end with a rounded portion 25a. The arm 26 is secured at one end to the bolster 3, and is provided at its free end with bifurcations 26b which form a jaw or socket 26c. The socket 26c receives the rounded portion 25a in such manner that rotation of the bolster 2 will produce equal and opposite rotation of the bolster 3. The ends 26d of the bifurcations are so shaped that they will engage the sides of the arm 25a when the bolsters have been rotated to the extreme positions in which the wheels just clear each other, and thus function as stops to limit the rotation of the bolsters to two extreme positions.

Referring now to Fig. 8 in the modification of my invention here shown, the bolsters 2 and 3 are interconnected by crossed ropes 27 and 28. The rope 27 is secured at one end to the bolster 2 adjacent its lower end, as viewed in Fig. 8, and at the other end to the upper end of the bolster 3, as viewed in Fig. 8. The rope 28 is secured at one end to the upper end at the bolster 2, as viewed in Fig. 8, and at the opposite end to the lower end of the bolster 3. It will be apparent that with the bolsters connected together in this manner rotation of the bolster 2 by the steering handle 13 will produce equal and opposite rotation of the bolster 3, so that the rear wheels will be made to substantially track the front wheels in all positions of the bolster in the same manner as in the preceding views.

One advantage of a vehicle embodying my invention is that the vehicle is very stable.

Another advantage of a vehicle embodying my invention is that very little floor space is needed for complete maneuverability of the vehicle.

Although I have herein shown and described only three forms of vehicles embodying my invention, it is to be understood that various changes and modifications may be made therein within the scope of the appended claims without departing from the spirit and scope of my invention.

Having thus described my invention, what I claim is:

1. In a child's vehicle, in combination, a seat board provided adjacent its front and rear ends with spaced holes, a steering post provided at its lower end with a portion of reduced diameter forming a shoulder and having said reduced portion rotatably mounted in and projecting downwardly through one of the holes in said seat board and said shoulder resting on the top of the board, a front bolster secured to the lower end of said steering post to be turned thereby, a rear bolster rotatably secured to said seat board by means of a member journaled in the other hole in said seat board, front and rear wheels rotatably attached to said front and rear bolsters, a recess formed in the inner face of the front bolster adjacent one end thereof, a recess formed in the inner face of the rear bolster adjacent the end opposite to the end in which the recess is formed in said front bolster, and a link pivotally attached at its opposite ends to said bolsters within said recesses so that turning movement of one bolster produces substantially equal and opposite rotation of the other bolster and the front and rear wheels are caused to substantially track in any position of the bolsters.

2. In a child's vehicle, in combination, a seat board provided adjacent its front and rear ends with spaced holes, a steering post provided at its lower end with a portion of reduced diameter forming a shoulder and having said reduced portion rotatably mounted in and projecting downwardly through one of the holes in said seat board and said shoulder resting on the top of the board, a front bolster secured to the lower end of said steering post to be turned thereby, a rear bolster rotatably secured to said seat board by means of a member journaled in the other hole in said seat board, front and rear wheels rotatably attached to said front and rear bolsters, a recess formed in the inner face of the front bolster adjacent one end thereof, a recess formed in the inner face of the rear bolster adjacent the end opposite to the end in which the recess is formed in said front bolster, and a link pivotally attached at its opposite ends to said bolsters within said recesses at points equidistant from the axes of rotation of the bolsters so that turning movement of one bolster produces substantially equal and opposite rotation of the other bolster and the front and rear wheels are caused to substantially track in any position of the bolsters.

3. In a child's vehicle, in combination, a seat board provided adjacent its front and rear ends with spaced holes, a steering post provided at its lower end with a portion of reduced diameter forming a shoulder and having said reduced portion rotatably mounted in and projecting downwardly through one of the holes in said seat board and said shoulder resting on the top of the board, a front bolster secured to the lower end of said steering post to be turned thereby, a rear bolster rotatably secured to said seat board by means of a member journaled in the other hole in said seat board, front and rear wheels rotatably attached to said front and rear bolsters, a recess formed in the inner face of the front bolster adjacent one end thereof, a recess formed in the inner face of the rear bolster adjacent the end opposite to the end in which the recess is formed in said front bolster, and a link pivotally attached at its opposite ends to said bolsters within said recesses so that turning movement of one bolster produces substantially equal and opposite rotation of the other bolster and the front and rear wheels are caused to substantially track in any position of the bolsters, said bolsters being provided at the inner sides of said recesses with surfaces which cooperate with said link and act as stops to limit rotation of said bolsters to extreme positions in which the front and rear wheels of the vehicle on one or the other side of the vehicle as the case may be will just clear each other.

WILLIAM F. O'HALLORAN.

REFERENCES CITED

The following references are of record in the file of this patent:

UNITED STATES PATENTS

| Number | Name | Date |
| --- | --- | --- |
| 659,274 | Williams | Oct. 9, 1900 |
| 693,586 | Bryant | Feb. 18, 1902 |
| 1,212,530 | McKnight | Jan. 16, 1917 |
| 1,625,421 | Pearl | Apr. 19, 1927 |
| 1,625,422 | Pearl | Apr. 19, 1927 |
| 1,900,108 | Hedeen et al. | Mar. 7, 1933 |
| 2,136,019 | Pfau | Nov. 8, 1938 |

FOREIGN PATENTS

| Number | Country | Date |
| --- | --- | --- |
| 652,749 | France | Sept. 21, 1927 |